United States Patent
Zhu

(10) Patent No.: US 11,892,090 B2
(45) Date of Patent: Feb. 6, 2024

(54) PLASTIC FAUCET BODY AND A DIE FOR MOLDING THE SAME

(71) Applicants: Xiamen Lota International Co., Ltd., Fujian (CN); Lota Xiamen Industry Co., Ltd., Fujian (CN)

(72) Inventor: Chuanbao Zhu, Fujian (CN)

( * ) Notice: Subject to any disclaimer, the term of this patent is extended or adjusted under 35 U.S.C. 154(b) by 965 days.

(21) Appl. No.: 16/619,424

(22) PCT Filed: Oct. 17, 2018

(86) PCT No.: PCT/CN2018/110596
§ 371 (c)(1),
(2) Date: Dec. 4, 2019

(87) PCT Pub. No.: WO2019/076311
PCT Pub. Date: Apr. 25, 2019

(65) Prior Publication Data
US 2020/0318749 A1  Oct. 8, 2020

(30) Foreign Application Priority Data

Oct. 17, 2017 (CN) .......................... 201721336029.2
Nov. 2, 2017 (CN) .......................... 201711061693.5

(51) Int. Cl.
*F16K 27/04* (2006.01)
*B29C 45/26* (2006.01)
(Continued)

(52) U.S. Cl.
CPC ........ *F16K 27/041* (2013.01); *B29C 45/2602* (2013.01); *B29C 45/2616* (2013.01);
(Continued)

(58) Field of Classification Search
CPC ............... F16K 27/041; B29C 45/2602; B29C 45/2616; B29C 45/33; B29C 45/44;
(Continued)

(56) References Cited

U.S. PATENT DOCUMENTS 8,651,132 B1 * 2/2014 Hu .................... E03C 1/0403
137/315.12
8,746,273 B2 * 6/2014 Yang .................. E03C 1/0403
137/328
(Continued)

FOREIGN PATENT DOCUMENTS

CN           101165378 A    4/2008
CN           203157057 U    8/2013
(Continued)

OTHER PUBLICATIONS

International Search Report for PCT Application No. PCT/CN2018/110596, dated Jan. 22, 2019 in 6 pages.

*Primary Examiner* — Lori L Baker
(74) *Attorney, Agent, or Firm* — Zhong Law LLC

(57) ABSTRACT

The disclosure relates to a plastic faucet body and a molding tool. The faucet body includes a left water inlet pipe and a right water inlet pipe, wherein a left valve seat installation recess is formed in the left water inlet pipe and a right valve seat installation recess is formed in the right water inlet pipe. A connecting cross-beam is disposed between the left water inlet pipe and the right water inlet pipe, wherein the connecting cross-beam is provided with a water outlet and a middle water channel is formed within the connecting cross-beam. The middle water channel includes a left water inlet channel and a right water inlet channel, wherein the left water inlet pipe and the water outlet are connected with the left water inlet channel, and the right water inlet pipe and the water outlet are connected with the right water inlet channel, and the left water inlet channel and the right water inlet channel are arc-shaped or U-shaped.

7 Claims, 5 Drawing Sheets

(51) Int. Cl.
*B29C 45/33* (2006.01)
*E03C 1/04* (2006.01)
*B29L 31/00* (2006.01)

(52) U.S. Cl.
CPC ............... *B29C 45/33* (2013.01); *E03C 1/04* (2013.01); *B29L 2031/7506* (2013.01); *B29L 2031/769* (2013.01)

(58) Field of Classification Search
CPC .......... B29C 2045/336; B29C 45/2681; B29C 45/332; B29C 45/14614; E03C 1/04; B29L 2031/7506; B29L 2031/769
USPC ............................................. 4/676, 675, 678
See application file for complete search history.

(56) References Cited

U.S. PATENT DOCUMENTS

| | | | |
|---|---|---|---|
| 11,524,436 B2 * | 12/2022 | Zhu | ............... B29C 45/36 |
| 2023/0060483 A1 * | 3/2023 | Zhu | ............... B29C 45/36 |

FOREIGN PATENT DOCUMENTS

| | | | | |
|---|---|---|---|---|
| CN | 106273270 A | | | 1/2017 |
| CN | 106426736 A | | | 2/2017 |
| CN | 107631069 A | | | 1/2018 |
| CN | 207421450 U | | | 5/2018 |
| CN | 212509650 U | * | | 2/2021 |
| CN | 216768490 U | * | | 6/2022 |
| CN | 115451160 A | * | | 12/2022 |
| JP | 10235684 A | | | 9/1998 |

* cited by examiner

PLASTIC FAUCET BODY AND A DIE FOR MOLDING THE SAME

CROSS-REFERENCE TO RELATED APPLICATIONS

This application is the U.S. National Phase under 35. U.S.C. § 371 of International Application PCT/CN2018/110596, filed Oct. 17, 2018, which claims priority to Chinese Patent Application No. 201721336029.2, filed Oct. 17, 2017 and Chinese Patent Application No. 2017110616935.5, filed Nov. 2, 2017. The disclosures of the above-described applications are hereby incorporated by reference in their entirety.

TECHNICAL FIELD

The invention belongs to the technical field of mechanics, particularly relates to a plastic faucet body and a die for molding the same.

BACKGROUND ART

An existing faucet body is generally H-shaped, including a left valve seat part, a right valve seat part, and a connecting part between the valve seat parts, wherein an installation recess is formed in each of the valve seat parts for respectively installing a valve body, in which each opposite valve body can be rotationally controlled by a handle A central flow channel is formed in the connecting part with two ends of the central flow channel being respectively communicated with the installation recess in the valve seat part, and at least one water outlet is arranged in the middle of the connecting part to be communicated with the central flow channel in which the water outlet is configured for connecting water outlet members such as faucet water outlet pipe or shower head. At present, the faucet body structure is universally molded integrally by metal copper, but the casting process is complicated and it has disadvantages of poor sealing and high cost.

In order to overcome the defects of metal faucets, a secondary injection molding process is adopted in prior art. But the secondary injection molding has the problem of the leakage at an injection molding joint surface. An invention with a publication number of CN201475461U discloses an injection molding structure of an inner core body of a faucet, wherein a cold water inlet pipe and a hot water inlet pipe are arranged on a water channel main body integrally molded with an injection molding structure, wherein the cold water inlet pipe and the hot water inlet pipe are provided with a cold water inlet channel and a hot water inlet channel. The cold water inlet pipe and the hot water inlet pipe are connected by a cross-beam therebetween, wherein the cross-beam is provided with a lateral core-pulling channel which is communicated with the cold water inlet channel, a lateral core-pulling channel which is communicated with the hot water inlet channel, and a water outlet. The lateral core-pulling channel communicated with the cold water inlet channel, the lateral core-pulling channel communicated with the hot water inlet channel and the water outlet collectively form an integrated water channel main body with an inner three-way structure, and a sealing plug is arranged on the lateral core-pulling hole in the integrally molded water channel main body. However, the water channel of the faucet body of the above invention still needs a sealing plug, a sealing ring and other sealing members to seal the faucet body, so that the sealing performance of the water channel of the faucet body is reduced and the risk of water leakage exists. Besides, although the sealing rings can be installed on two sides of the valve core by means of core-pulling process when the faucet is injection molded, due to the complicated core-pulling process the production efficiency and the yield are low, making the faucet body not suitable for mass production.

SUMMARY OF THE INVENTION

The object of the invention is that to solve the problems existing in prior art, a core-pulling lateral opening of a central flow passage is eliminated, i.e. the lateral core-pulling hole of a body and sealing members such as sealing plugs of the lateral core-pulling hole and the like are eliminated, such that a plastic faucet body with good sealing performance is provided and a die for molding the plastic faucet body is also provided.

The technical scheme adopted by the invention is as follows:

A plastic faucet body includes a left water inlet pipe and a right water inlet pipe, wherein the left water inlet pipe is provided with a left valve seat installation recess and the right water inlet pipe is provided with a right valve seat installation recess. A connecting cross-beam is arranged between the left water inlet pipe and the right water inlet pipe, and a water outlet is arranged in the middle of the connecting cross-beam. A middle water channel is arranged in the connecting cross-beam, wherein the middle water channel is communicated with the left water inlet pipe and the middle water channel is communicated with the right water inlet pipe and the middle water channel is communicated with the water outlet. The middle water channel includes a left water inlet channel and a right water inlet channel, and the left water inlet channel and the right water inlet channel are arc-shaped or U-shaped. Further, the axis of the water outlet is parallel to the axes of the left water inlet pipe and the right water inlet pipe, respectively. The axis of the water outlet and the axes of the left water inlet pipe and the right water inlet pipe lie in the same plane.

Further, an angle between the axis of the water outlet and a plane in which the axes of the left water inlet pipe and the right water inlet pipe lie is 45°.

Further, a reinforcing rib is arranged between the connecting cross-beam and the left water inlet pipe and between the connecting cross-beam and the right water inlet pipe, respectively.

Further, each of the left water inlet pipe and the right water inlet pipe are connected with a copper pipe, and the copper pipe is respectively communicated with the corresponding left water inlet pipe and the corresponding right water inlet pipe. The copper pipe is installed in the die during the product manufacturing process, and the plastic faucet body and the copper pipe are integrally injection molded in an embedded manner.

A die for molding a plastic faucet body includes an upper mold, wherein the upper mold is provided with a left water inlet mold core cavity and a right water inlet mold core cavity, the left water inlet mold core cavity being internally provided with a detachable left water inlet mold core and the right water inlet mold core cavity being internally provided with a detachable right water inlet mold core. The mold further includes a fixed mold, a left water inlet channel core-pulling mechanism and a right water inlet channel core-pulling mechanism, and the fixed mold and the upper mold are matched to form an injection molding cavity. The injection molding cavity includes a flow passage and a product molding cavity, wherein the fixed mold is provided with an inner core of the installation recess of a left valve seat and an inner core of the installation recess of a right valve seat, and the fixed mold is provided with a water outlet mold core.

Further, the left water inlet channel core-pulling mechanism and the right water inlet channel core-pulling mechanism are respectively provided with a left crank and a right crank which are hinged inside the fixed mold. The left crank and the right crank can rotate at a certain angle around the hinge point thereof inside the fixed mold. Another end of the left crank is provided with a left water inlet channel mold core, and another end of the right crank is provided with a right water inlet channel mold core, and the left water inlet channel mold core and the right water inlet channel mold core are arc-shaped.

Further, the fixed mold is provided with a crank action cavity, wherein the left crank and the right crank are hinged in the crank action cavity. The left water inlet channel core-pulling mechanism includes a left sliding block arranged in a guide rail of the fixed mold, and the left sliding block is fixedly connected with a left connecting rod. One end of the left connecting rod is provided with a left protrusion which moves in a small chute of the left crank. The right water inlet channel core-pulling mechanism includes a right sliding block arranged in a guide rail of a fixed mold, and the right sliding block is fixedly connected with a right connecting rod. One end of the right connecting rod is provided with a right protrusion which moves in a small chute of the right crank. Further, the fixed mold is provided with a core-pulling mechanism action cavity, and the left crank and the right crank are hinged in the core-pulling mechanism action cavity. Teeth are arranged on the outer edges of the left water inlet channel mold core and the right water inlet channel mold core. The left and right water inlet channel core-pulling mechanisms include: the fixed mold being provided with a left rack chamber and a right rack chamber; the left rack chamber being internally provided with a left rack and the right rack chamber being provided with a right rack; the fixed mold being provided with a left pinion chamber and a right pinion chamber wherein the left pinion chamber is provided with a left pinion shaft and the left pinion shaft is provided with a left pinion and the right pinion chamber is provided with a right pinion shaft and the right pinion shaft is provided with a right pinion; the left pinion being meshed with the left crank and the right pinion being meshed with the right crank; the left rack chamber being communicated with the left pinion chamber and the left rack being meshed with the left pinion; and the right rack chamber being communicated with the right pinion chamber and the right rack being meshed with the right pinion.

Further, the inner core of the installation recess of the left valve seat is provided with an arc-shaped slot and the left water inlet channel mold core moves in the arc-shaped slot of the inner core of the installation recess of the left valve seat; the inner core of the installation recess of the right valve seat is provided with an arc-shaped slot; and the water outlet mold core is provided with a left core slot and a right core slot. In a one-time-molding process, the top end of the left water inlet channel mold core enters the corresponding left core slot, and the top end of the right water inlet channel mold core enters the corresponding right core slot.

In summary, due to the adoption of the above technical scheme, the invention has the beneficial effects as follows.

1. According to the invention, the left water inlet channel mold core and the right water inlet channel mold core of the middle water channel are pulled from the valve seat installation recess in the left water inlet pipe and the right water inlet pipe through the arranged four-bar linkage mechanism or the rotary crank mechanism, so that the left and right middle water channel core-pulling holes in the prior art are avoided. That is, the core-pulling lateral opening of the central flow passage in the prior art is eliminated, and sealing members such as sealing plugs and the like for sealing the lateral core-pulling hole are also eliminated, such that the number of the assembly members of the faucet body is reduced, and the sealing effect is enhanced, and leaking can be effectively prevented.

2. According to the invention, the axis of the water outlet is parallel to the axes of the left water inlet pipe and the right water inlet pipe, and the axis of the water outlet is located in the same plane with that of the axes of the left water inlet pipe and the right water inlet pipe, so that the technical difficulty in manufacturing the plastic faucet is reduced.

3. According to the invention, a reinforcing rib is arranged between the left water inlet pipe and the connecting cross-beam and between the right water inlet pipe and the connecting cross-beam, respectively, so that the structural strength of the plastic faucet during the integral molding can be improved.

4. According to the invention, the plastic body and the copper pipe are integrally molded in an embedded manner during the manufacturing, so that the good sealing performance and the structural strength of the product can be guaranteed. Moreover, the copper pipe is in threaded connection with the water pipe, so that the defect of poor sealing performance due to insufficient tightening connection between the plastic body and the water pipe caused by the fact that the plastic body is poor in strength and thread torsion force is avoided, that is, the sealing performance is good. Meanwhile, the plastic faucet body is integrally molded at one time so that the process is simplified, and the cost is reduced, and the production efficiency is improved.

DETAILED DESCRIPTION OF THE INVENTION

Figure 1:
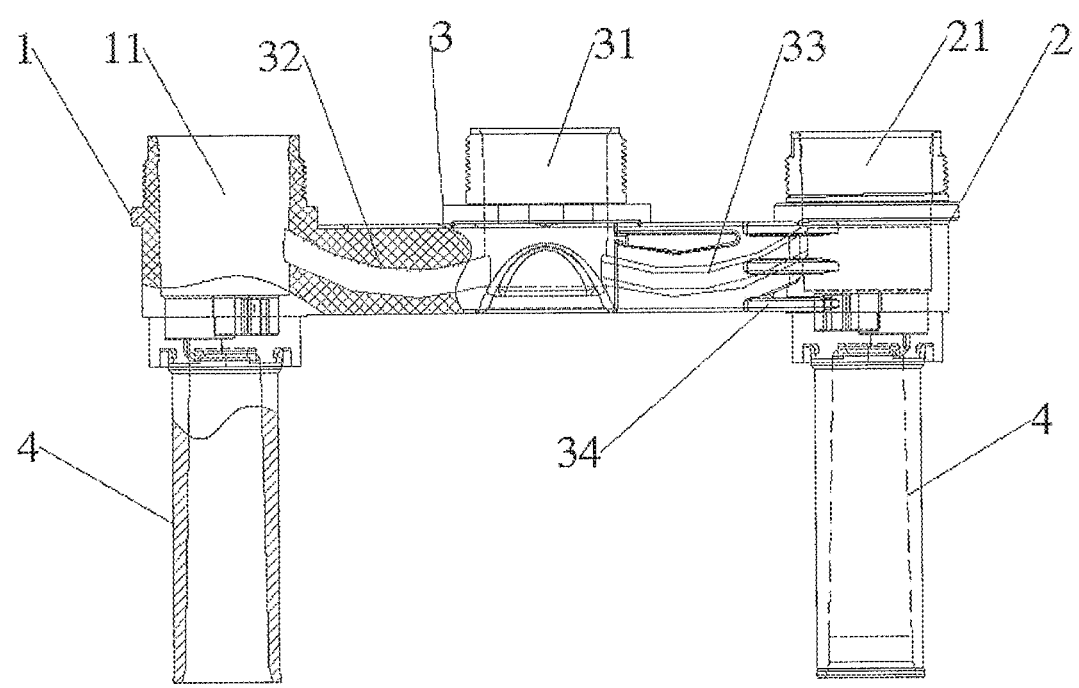
FIG. 1 is a schematic view showing the structure of a product according to the present invention.
Figure 2:
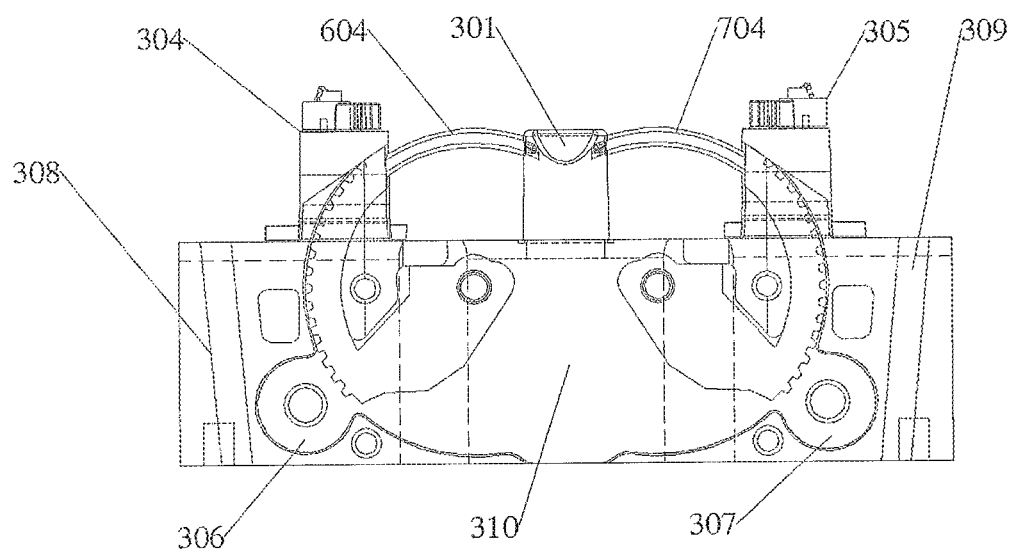
FIG. 2 is a schematic view showing the structure of a fixed mold according to the present invention.
Figure 3:
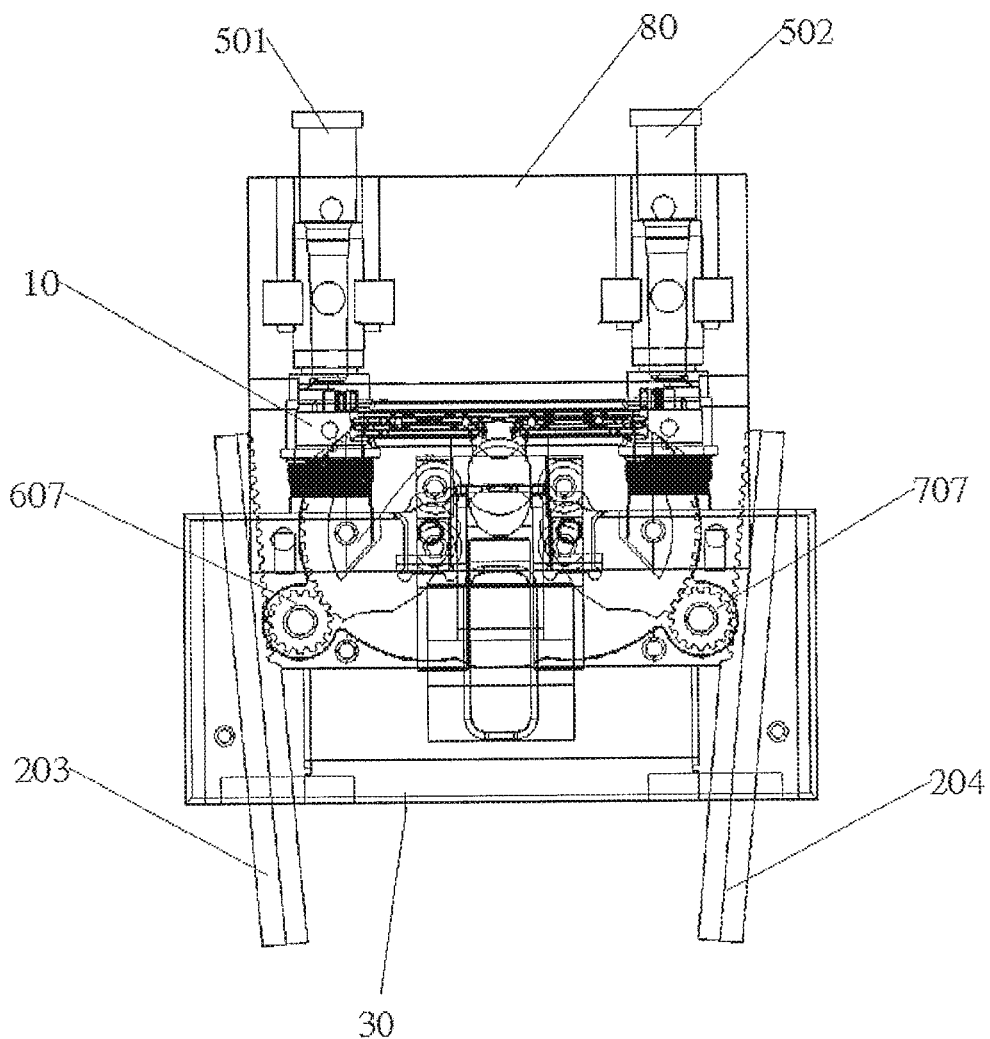
FIG. 3 is a schematic view of a pinion and rack core-pulling mechanism of the present invention.
Figure 4:
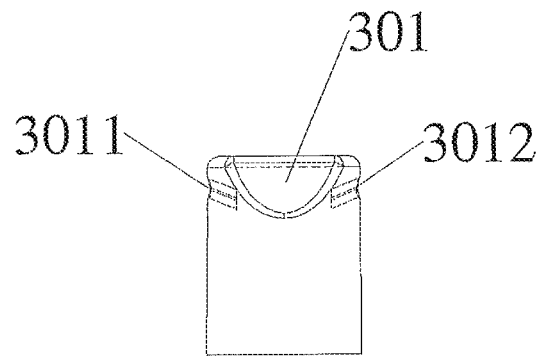
FIG. 4 is a schematic view of a mold core mechanism of a water outlet of the present invention.
Figure 5:
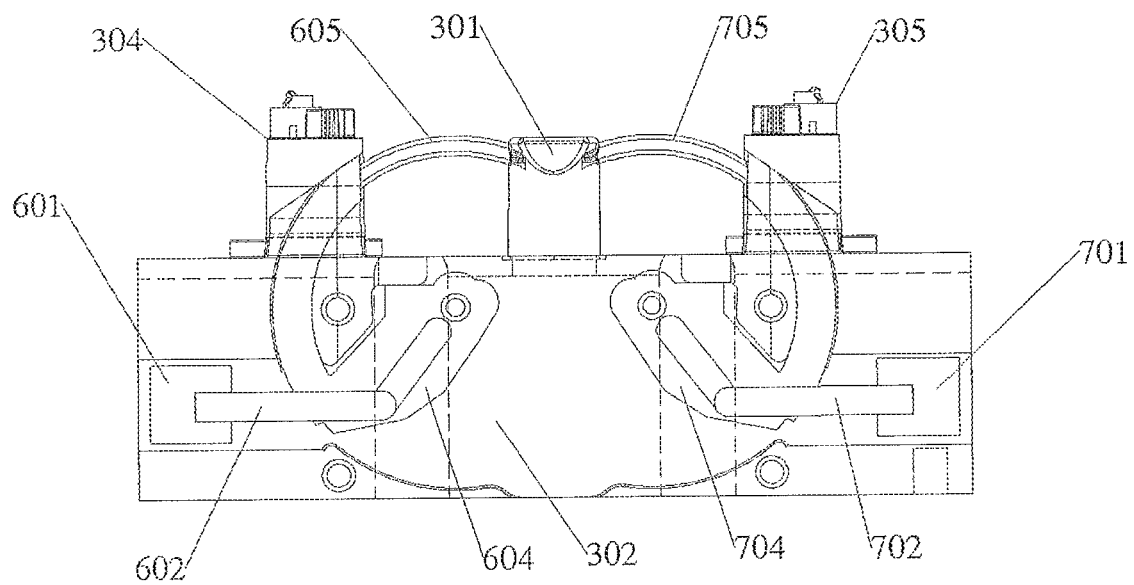
FIG. 5 is a schematic view showing the structure of a fixed mold according to the present invention.
Figure 6:
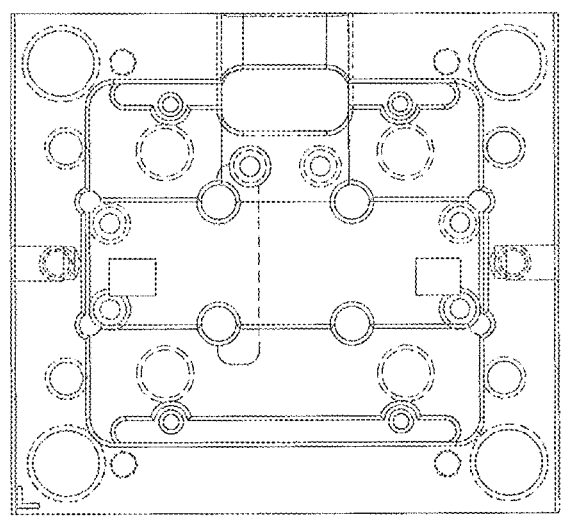
FIG. 6 is a top view of a die base of the present invention; and wherein the numerals in all the drawings refer to: 1—a left water inlet pipe, 11—a left valve seat installation recess, 2—a right water inlet pipe, 21—a right valve seat installation recess, 3—a connecting cross-beam, 31—a water outlet, 32—a left water inlet channel, 33—a right water inlet channel, 34—a reinforcing rib, 4—a copper pipe, 10—a plastic faucet body, 203—a left rack, 204—a right rack, 30—a fixed mold, 301—a water outlet mold core, 3011—a left core slot, 3012—a right core slot, 302—a crank action cavity, 304—an inner core of the installation recess of a left valve seat, 305—an inner core of the installation recess of a right valve seat, 306—a left pinion chamber, 307—a right pinion chamber, 308—a left rack chamber, 309—a right rack chamber, 310—a core-pulling mechanism action cavity, 501—a left water inlet mold core, 502—a right water inlet mold core, 601—a left sliding block, 602—a left connecting rod, 604—a left crank, 605—a left water inlet channel mold core; 701—a right sliding block, 702—a right connecting rod, 704—a right crank, and 705—a right water inlet channel mold core.

In order to make the object, technical schemes and advantages of the present invention clearer and more fully understood, the present invention will be described in further detail with reference to the accompanying drawings and embodiments. It should be understood that the preferred embodiments described herein are merely illustrative of the invention and are not intended to limit the scope thereof.

The present invention discloses a plastic faucet body 10 including a left water inlet pipe 1 and a right water inlet pipe 2, wherein the left water inlet pipe 1 is provided with a left valve seat installation recess 11; the right water inlet pipe 2 is provided with a right valve seat installation recess 21; a connecting cross-beam 3 is arranged between the left water inlet pipe 1 and the right water inlet pipe 2; a water outlet 31 is arranged in the middle of the connecting cross-beam 3; and a middle water channel is arranged in the connecting cross-beam 3, wherein the middle water channel is communicated with the left water inlet pipe 1, the right water inlet pipe 2, and the water outlet 32. The middle water channel includes a left water inlet channel 32 and a right water inlet channel 33, wherein the left water inlet channel 32 and the right water inlet channel 33 are arc-shaped or U-shaped.

Further, the axis of the water outlet 31 is parallel to the axes of the left water inlet pipe 1 and the right water inlet pipe 2. The axis of the water outlet 31 and the axes of the left water inlet pipe 1 and the right water inlet pipe 2 lie in the same plane.

Further, an angle between the axis of the water outlet 31 and a plane in which the axes of the left water inlet pipe 1 and the right water inlet pipe 2 lie is 45°.

Further, a reinforcing rib 34 is arranged between the connecting cross-beam 3 and the left water inlet pipe 1 and between the connecting cross-beam 3 and the right water inlet pipe 2, respectively. Further, the left water inlet pipe and the right water inlet pipe are embedded with a threaded copper pipe 4, and the copper pipe 4 is respectively communicated with the corresponding left water inlet pipe 1 and the corresponding right water inlet pipe 2. The copper pipe 4 is installed in the die during the product manufacturing process, and the plastic faucet body 10 and the copper pipe 4 are integrally injection molded.

A die for molding a plastic faucet body, comprises an upper mold 80, wherein the upper mold 80 is provided with a left water inlet mold core cavity and a right water inlet mold core cavity, wherein the left water inlet mold core cavity being internally provided with a detachable left water inlet mold core 501 and the right water inlet mold core cavity being internally provided with a detachable right water inlet mold core 502. The die further includes a fixed mold 30, a left water inlet channel core-pulling mechanism and a right water inlet channel core-pulling mechanism. The fixed mold 30 and the upper mold 80 are matched to form an injection molding cavity, which includes a flow passage and a product molding cavity. The fixed mold 30 is provided with an inner core of the installation recess of a left valve seat 304 and an inner core of the installation recess of a right valve seat 305, and the fixed mold 30 is provided with a water outlet mold core 301.

Further, the left water inlet channel core-pulling mechanism and the right water inlet channel core-pulling mechanism are respectively provided with a left crank 604 and a right crank 704 which are hinged in the fixed mold, and the left crank 604 and the right crank 704 can rotate at a certain angle around the hinge point thereof in the fixed mold 30; and another end of the left crank 604 is provided with a left water inlet channel mold core 605, and another end of the right crank 704 is provided with a right water inlet channel mold core 705, wherein the left water inlet channel mold core 605 and the right water inlet channel mold core 705 are arc-shaped.

Further, the fixed mold 30 is provided with a crank action cavity 302 and a left crank 604 and a right crank 704 are hinged inside the crank action cavity 302. The left water inlet channel core-pulling mechanism includes a left sliding block 601 arranged in a guide rail of the fixed mold 30, wherein the left sliding block 601 is fixedly connected with a left connecting rod 602, and one end of the left connecting rod 602 is provided with a left protrusion which moves in the small chute of the left crank 604. The right water inlet channel core-pulling mechanism includes a right sliding block 701 arranged in a guide rail of the fixed mold 30, wherein the right sliding block 701 is fixedly connected with a right connecting rod 702, and one end of the right connecting rod 702 is provided with a right protrusion which moves in the small chute of the right crank 704.

Further, the fixed mold 30 is provided with a core-pulling mechanism action cavity 310, wherein the left crank 604 and the right crank 704 are hinged in the core-pulling mechanism action cavity 310, and teeth are arranged on the outer edges of the left water inlet channel mold core 605 and the right water inlet channel mold core 705. The left and right water inlet channel core-pulling mechanisms includes, the fixed mold 30 is provided with a left rack chamber 308 and a right rack chamber 309, a left rack 203 disposed within the left rack chamber 308, the right rack chamber 309 is provided with a right rack 204, the fixed mold 30 provided with a left pinion chamber 306 and a right pinion chamber 307, the left pinion chamber 306 provided with a left pinion shaft having a left pinion 607, the right pinion chamber 307 provided with a right pinion shaft having a right pinion 707, the left pinion 607 being meshed with the left crank 604, the right pinion 707 being meshed with the right crank 704, the left rack chamber 308 being communicated with the left pinion chamber 306, the left rack 203 being meshed with the left pinion 607, the right rack chamber 309 being communicated with the right pinion chamber 307, and the right rack 204 being meshed with the right pinion 707.

Further, the inner core of the installation recess of the left valve seat 304 is provided with an arc slot, and the inner core of the installation recess of the right valve seat 305 is provided with an arc slot. The water outlet mold core is provided with a left core slot 3011 and a right core slot 3012. In one-time-molding process, the tip end of the left water inlet channel mold core 605 enters the corresponding left core slot 3011, and the tip end of the right water inlet channel mold core 705 enters the corresponding right core slot 3012.

According to the present invention, during the molding production process, the fixed middle water channel mold core used in the prior art is replaced with a four-bar linkage core-pulling mechanism or a rotary crank mechanism to pull out the mold core from a valve seat installation recess, i.e. sealing members such as side holes, sealing plugs for sealing the side holes and the like are not required to be arranged on the left side and the right side of the body. The plastic body integrally molded with copper pipes in an embedded manner also ensures good sealing performance and the reliability of the connection. According to the plastic faucet body disclosed by the invention, the assembly members of the faucet body are reduced, and the sealing effect is enhanced, and leaking can be effectively prevented.

Embodiment 1

A die for molding a plastic faucet body is disclosed, which comprises a die base and an upper mold 80, wherein the upper mold 80 is provided with a left water inlet mold core cavity and a right water inlet mold core cavity, the left water inlet mold core cavity being internally provided with a detachable left water inlet mold core 501 and the right water inlet mold core cavity being internally provided with a detachable right water inlet mold core 502. The mold further includes a fixed mold 30, a left water inlet channel core-pulling mechanism and a right water inlet channel core-pulling mechanism. The fixed mold 30 and the upper mold 80 are matched to form an injection molding cavity, which includes a flow passage and a product molding cavity. The fixed mold 30 is provided with an inner core of the installation recess of a left valve seat 304 and an inner core of the installation recess of a right valve seat 305, and the fixed mold 30 is provided with a water outlet mold core 301. The left water inlet channel core-pulling mechanism and the right water inlet channel core-pulling mechanism are respectively provided with one left crank 604 and one right crank 704 which are hinged inside the fixed mold. The left crank 604 and the right crank 704 can rotate at a certain angle around the hinge point thereof inside the fixed mold 30. The other end of the left crank 604 is provided with a left water inlet channel mold core 605, and the other end of the right crank 704 is provided with a right water inlet channel mold core 705, and the left water inlet channel mold core 605 and the right water inlet channel mold core 705 are arc-shaped. The fixed mold 30 is provided with a crank action cavity 302, and the left crank 604 and the right crank 704 are hinged in the crank action cavity 302. The left water inlet channel core-pulling mechanism includes a left sliding block 601 arranged in a guide rail of the fixed mold 30, and the left sliding block 601 is fixedly connected with a left connecting rod 602, one end of the left connecting rod 602 being provided with a left protrusion, which moves in a small chute of the left crank 604; and the right water inlet channel core-pulling mechanism includes a right sliding block 701 arranged in a guide rail of the fixed mold 30, and the right sliding block 701 is fixedly connected with a right connecting rod 702, one end of the right connecting rod 702 being provided with a right protrusion, which moves in a small chute of the right crank 704. The inner core of the installation recess of the left valve seat 304 is provided with an arc-shaped slot, wherein the left water inlet channel mold core moves in the arc-shaped slot of the inner core of the installation recess of the left valve seat 304; and the inner core of the installation recess of the right valve seat 305 is provided with an arc-shaped slot. The water outlet mold core 301 is provided with a left core slot 3011 and a right core slot 3012. In the integrated injection molding process, the tip end of the left water inlet channel mold core 605 enters the corresponding left core slot 3011, and the tip end of the right water inlet channel mold core 705 enters the corresponding right core slot 3012.

During the manufacturing process, the fixed mold is placed in the corresponding position of the die base. After two copper pipes are provided on the corresponding left and right water inlet mold cores of the upper mold, the upper mold 80 slides along the slot on the fixed mold 30 until the upper mold 80 is bonded and fixed with the fixed mold 30. Then the left and right water inlet channel mold cores are placed into the arc-shaped slots of the inner cores of the left and right installation recess until the top end of the left water inlet channel mold core 605 enters the corresponding left core slot 3011 and the top end of the right water inlet channel mold core 705 enters the corresponding right core slot 3012. Then injecting glue, maintaining pressure, cooling and opening mold are performed. When the upper mold 80 is opened, the plastic faucet body and the two copper pipes are integrally one-time injection-molded in an embedded manner, and the middle water channel is formed. However, the left and right water inlet channel mold cores are still positioned in the plastic faucet body 10, and the left and right sliding blocks are pushed to the inward direction of the mold such that the left and right sliding blocks push the left and right connecting rods to move. The left and right protrusions of the left and right connecting rods move in the small chutes of the left and right cranks, forcing the left and right cranks to rotate around the hinge points thereof. Since the motion track of the four-bar linkage mechanism is preset, at the moment, the mold cores of the left water inlet channel and the right water inlet channel of the left crank and the right crank can be pulled out along the track such that the arc-shaped left and right water inlet channels are left in the connecting cross-beam.

According to the plastic faucet manufactured by the die, the number of sealing members such as sealing plugs and the like for sealing the mold cores of the left and right middle water channels in the prior art is reduced; the sealing effect is enhanced; leakage can be effectively prevented; the body strength of the plastic faucet is improved; and the processing difficulty is reduced. Meanwhile, the plastic faucet body is integrally molded at one time so that the process is simplified, and the cost is reduced, and the production efficiency is improved.

Embodiment 2

A die for molding a plastic faucet body is disclosed, which comprises a die base and an upper mold 80, wherein the upper mold 80 is provided with a left water inlet mold core cavity and a right water inlet mold core cavity, the left water inlet mold core cavity being internally provided with a detachable left water inlet mold core 501 and the right water inlet mold core cavity being internally provided with a detachable right water inlet mold core 502. The die further includes a fixed mold 30, a left water inlet channel core-pulling mechanism and a right water inlet channel core-pulling mechanism. The fixed mold 30 and the upper mold 80 are matched to form an injection molding cavity, which includes a flow passage and a product molding cavity. The fixed mold 30 is provided with an inner core of the installation recess of a left valve seat 304 and an inner core of the installation recess of a right valve seat 305, and the fixed mold 30 is provided with a water outlet mold core 301. The left water inlet channel core-pulling mechanism and the right water inlet channel core-pulling mechanism are respectively provided with a left crank 604 and a right crank 704 which are hinged inside the fixed mold. The left crank 604 and the right crank 704 can rotate at a certain angle around the hinge point thereof inside the fixed mold 30. Another end of the left crank 604 is provided with a left water inlet channel mold core 605, and another end of the right crank 704 is provided with a right water inlet channel mold core 705, and the left water inlet channel mold core 605 and the right water inlet channel mold core 705 are arc-shaped. The fixed mold 30 is provided with a core-pulling mechanism action cavity 310, and a left crank 604 and a right crank 704 are hinged in the core-pulling mechanism action cavity 310. Teeth are arranged on the outer edges of the water inlet channel mold core 605 and the right water inlet channel mold core 705. The left and right water inlet channel core-pulling mechanisms include: the fixed mold 30 being provided with a left rack chamber 308 and a right rack chamber 309 wherein a left rack 203 is arranged in the left rack chamber 308 and a right rack 204 is arranged in the right rack chamber 309; the fixed mold 30 being provided with a left pinion chamber 306 and a right pinion chamber 307 wherein the left pinion chamber 306 is provided with a left pinion shaft and the left pinion shaft is provided with a left pinion 607, and wherein the right pinion chamber 307 is provided with a right pinion shaft, and the right pinion shaft is provided with a right pinion 707; the left pinion 607 being meshed with the left crank 604 and the right pinion 707 being meshed with the right crank 704; the left rack chamber 308 being communicated with the left pinion chamber 306, and the left rack 203 being meshed with the left pinion 607; and the right rack chamber 309 being communicated with the right pinion chamber 307 and the right rack 204 being meshed with the right pinion 707. The inner core of the installation recess of the left valve seat 304 is provided with an arc-shaped slot, and the left water inlet channel mold core moves in the arc-shaped slot of the inner core of the installation recess of the left valve seat; and the inner core of the installation recess of the right valve seat 305 is provided with an arc-shaped slot, and the right water inlet channel mold core moves in the arc-shaped slot of the inner core of the installation recess of the right valve seat. The water outlet mold core 301 is provided with a left core slot 3011 and a right core slot 3012. In the integrated injection molding process, the tip end of the left water inlet channel mold core 605 enters the corresponding left core slot 3011, and the tip end of the right water inlet channel mold core 705 enters the corresponding right core slot 3012.

During the manufacturing process, the fixed mold 30 is placed at the corresponding position of the die base. Two copper pipes are provided on the corresponding left and right water inlet mold cores of the upper mold 80, and the upper mold 80 slides along the slot on the fixed mold until the upper mold 80 is bonded and fixed with the fixed mold. Then injecting glue, maintaining pressure, cooling and taking down the upper mold are performed. Then the upper mold 80 slides along the slot of the fixed mold 30 to open the mold and the upper mold 80 is separated from the fixed mold 30. At the moment, the plastic faucet body 10 and the embedded copper pipe are integrated via one-time-molding, but the left and right water inlet channel mold cores are still positioned in the plastic faucet body 10. The left and right racks are pulled downwards out from the corresponding left and right racks, and the left and right racks drive the corresponding left and right pinions to rotate, and the left and right pinions drive the corresponding left and right cranks to rotate around the hinge points thereof. Since the motion track of the left and right cranks is preset, to pull out from the corresponding left and right valve seat installation recess of the left and right water inlet pipes leaves arc-shaped left and right water inlet channels in the connecting cross-beam. According to the plastic faucet manufactured by the die, the assembly members of the faucet body are reduced; the sealing effect is enhanced; leakage can be effectively prevented; the body strength of the plastic faucet is improved; and the processing difficulty is reduced. Meanwhile, the plastic faucet body is integrally molded at one time, so that the process is simplified, and the cost is reduced, and the production efficiency is improved.

Embodiment 3

A plastic faucet body 10 is disclosed, which comprises a left water inlet pipe 1 and a right water inlet pipe 2, wherein the left water inlet pipe 1 is provided with a left valve seat installation recess 11 and the right water inlet pipe 2 is provided with a right valve seat installation recess 21. A connecting cross-beam 3 is arranged between the left water inlet pipe 1 and the right water inlet pipe 2 and a water outlet 31 is arranged in the middle of the connecting cross-beam 3. A middle water channel is arranged in the connecting cross-beam 3, and the middle water channel is communicated with the left water inlet pipe 1. The middle water channel is communicated with the right water inlet pipe 2. The middle water channel is communicated with the water outlet 32. The middle water channel includes a left water inlet channel 32 and a right water inlet channel 33, and the left water inlet channel 32 and the right water inlet channel 33 are arc-shaped or U-shaped on a plane formed by the axis of the left water inlet pipe 1 and the axis of the right water inlet pipe 2. The axis of the water outlet 31 is parallel to the axes of the left water inlet pipe 1 and the right water inlet pipe 2, and the axis of the water outlet 31 and the axes of the left water inlet pipe 1 and the right water inlet pipe 2 lie in the same plane. A reinforcing rib 34 is arranged between the connecting cross-beam 3 and the left water inlet pipe 1 and between the connecting cross-beam 3 and the right water inlet pipe 2, respectively. The left water inlet pipe and the right water inlet pipe are embedded with a copper pipe 4 with threads, and the copper pipe 4 is respectively communicated with the corresponding left water inlet pipe 1 and the corresponding right water inlet pipe 2; and the copper pipe is installed in the die during the product manufacturing process such that the plastic faucet body 10 and the copper pipe 4 are integrally injection molded.

According to the embodiment, the core-pulling lateral opening of the central flow passage used in the prior art is eliminated, and sealing members such as sealing plugs and the like for sealing the side core-pulling hole are also eliminated, such that the number of the assembly members of the faucet body is reduced and the sealing effect is enhanced and leaking can be effectively prevented. The fact that the axis of the water outlet 31 is parallel to the axes of the left water inlet pipe 1 and the right water inlet pipe 2, and the axis of the water outlet 31 and the axes of the left water inlet pipe 1 and the right water inlet pipe 2 lie in the same plane reduces the technical difficulty in manufacturing the plastic faucet. The reinforcing rib 34 is arranged between the left water inlet pipe and the connecting cross beam 3 and between the right water inlet pipe and the connecting cross-beam 3, so that the structural strength of the plastic faucet during the integral molding process can be improved. The plastic body and the copper pipe 4 are integrally molded in an embedded mode during manufacturing, so that the good sealing performance and the structural strength of the product can be guaranteed. In addition, the copper pipe 4 is in threaded connection with the water pipe so that the defect of poor sealing performance due to insufficient tightening connection between the plastic body and the water pipe caused by the fact that the plastic body is poor in strength and thread torsion force is avoided, that is, the sealing performance is good.

The above is only preferred embodiments of the present invention, and is not intended to limit the present invention. Any modifications, equivalent substitutions and improvements made within the spirit and principles of the present invention should be included in the protection scope of the present invention.

What is claimed is:

1. A plastic faucet body comprising: a left water inlet pipe and a right water inlet pipe, wherein the left water inlet pipe is provided with a left valve seat installation recess and the right water inlet pipe is provided with a right valve seat installation recess, and a connecting cross-beam disposed between the left water inlet pipe and the right water inlet pipe, which connecting cross-beam is provided with a water outlet and is internally provided with a middle water channel, wherein the middle water channel is communicated with the left water inlet pipe, the right water inlet pipe, and the water outlet, wherein the middle water channel comprises a left water inlet channel and a right water inlet channel, and wherein the left water inlet pipe and the water outlet are communicated with the left water inlet channel, and the right water inlet pipe and the water outlet are communicated with the right water inlet channel, and the left water inlet channel and the right water inlet channel are arc-shaped or U-shaped;
wherein an axis of the water outlet is parallel to axes of the left water inlet pipe and the right water inlet pipe, respectively, and wherein the axis of the water outlet and the axes of the left water inlet pipe and the right water inlet pipe lie in the same plane;
wherein each of the left water inlet pipe and the right water inlet pipe is connected with a copper pipe, wherein the copper pipe is respectively communicated with the corresponding left water inlet pipe and the corresponding right water inlet pipe.

2. The plastic faucet body according to claim 1, wherein an angle included between the axis of the water outlet and a plane in which the axes of the left water inlet pipe and the right water inlet pipe lie is 45°.

3. The plastic faucet body according to claim 1, wherein a reinforcing rib is arranged between the connecting cross-beam and the left water inlet pipe and between the connecting cross-beam and the right water inlet pipe, respectively.

4. A die for molding a plastic faucet body comprising: an upper mold provided with a left water inlet mold core cavity and a right water inlet mold core cavity, the left water inlet mold core cavity being internally provided with a detachable left water inlet mold core, the right water inlet mold core cavity being internally provided with a detachable right water inlet mold core, a fixed mold, and a left water inlet channel core-pulling mechanism and a right water inlet channel core-pulling mechanism, wherein the fixed mold and the upper mold are cooperated to form an injection molding cavity which comprises a flow passage and a product molding cavity, wherein the fixed mold is provided with an inner core of the installation recess of a left valve seat and an inner core of the installation recess of a right valve seat, and wherein the fixed mold is provided with a water outlet mold core;
wherein the left water inlet channel core-pulling mechanism and the right water inlet channel core-pulling mechanism are respectively provided with a left crank and a right crank which are hinged inside the fixed mold, wherein each of the left crank and the right crank is able to rotate at a certain angle around the hinge point thereof inside the fixed mold, wherein another end of the left crank is provided with a left water inlet channel mold core and another end of the right crank is provided with a right water inlet channel mold core, and wherein the left water inlet channel mold core and the right water inlet channel mold core are arc-shaped.

5. The die according to claim 4, wherein the fixed mold is provided with a crank action cavity, and the left crank and the right crank are hinged in the crank action cavity; wherein the left water inlet channel core-pulling mechanism comprises a left sliding block arranged in a guide rail of the fixed mold, and the left sliding block is fixedly connected with a left connecting rod; wherein one end of the left connecting rod is provided with a left protrusion, which moves in a small chute of the left crank; wherein the right water inlet channel core-pulling mechanism comprises a right sliding block arranged in a guide rail of the fixed mold and the right sliding block is fixedly connected with a right connecting rod; and wherein one end of the right connecting rod is provided with a right protrusion, which moves in a small chute of the right crank.

6. The die according to claim 4, wherein the fixed mold is provided with a core-pulling mechanism action cavity and the left crank and the right crank are hinged in the core-pulling mechanism action cavity; wherein teeth are arranged on the outer edges of the left water inlet channel mold core and the right water inlet channel mold core; herein the left and right water inlet channel core-pulling mechanisms comprise, wherein the fixed mold is provided with a left rack chamber and a right rack chamber, the left rack chamber is internally provided with a left rack and the right rack chamber is provided with a right rack, wherein the fixed mold is provided with a left pinion chamber and a right pinion chamber the left pinion chamber is provided with a left pinion shaft having a left pinion, and the right pinion chamber is provided with a right pinion shaft having a right pinion, wherein the left pinion is meshed with the left crank and the right pinion is meshed with the right crank, and wherein the left rack chamber is communicated with the left pinion chamber and the left rack is meshed with the left pinion, while the right rack chamber is communicated with the right pinion chamber and the right rack is meshed with the right pinion.

7. The die according to claim 4, wherein the inner core of the installation recess of the left valve seat is provided with an arc-shaped slot, and the inner core of the installation recess of the right valve seat is provided with an arc-shaped slot; and wherein the water outlet mold core is provided with a left core slot and a right core slot.

* * * * *